Figure 1:
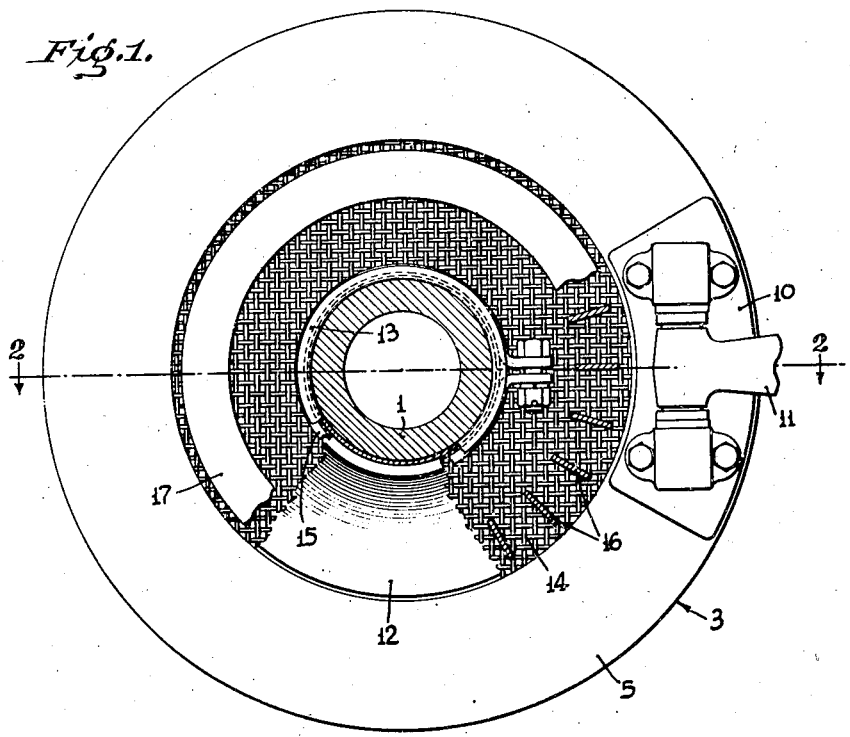

Dec. 2, 1947.  C. L. EKSERGIAN  2,431,741
BRAKE DISC
Filed Dec. 29, 1944

INVENTOR.
Carolus L. Eksergian
BY John P. Barbor
ATTORNEY

Patented Dec. 2, 1947

2,431,741

UNITED STATES PATENT OFFICE 2,431,741

BRAKE DISC

Carolus L. Eksergian, Detroit, Mich., assignor to The Budd Company, Philadelphia, Pa., a corporation of Pennsylvania Application December 29, 1944, Serial No. 570,305

4 Claims. (Cl. 188—264)

1

The invention relates to brake mechanisms, and more particularly to the centrifugal blower type of rotary brake members.

The invention has for its object a more certain and uniform cooling of the braking surfaces of such brake members, the avoidance of clogging of the inner ends of the blower passages, and a generally simplified structure for effecting these functions.

To these ends, the centrifugal blower type of brake member comprising the spaced brake rings supported in radially spaced relation from an associated wheel and axle assembly has associated with it an air deflector means, secured to the axle of said assembly, and extending radially outwardly to terminate substantially at the inner periphery of said rings. More specifically, this deflector means may comprise a dished disc secured to the axle.

To prevent clogging of the centrifugal blower formed by the spaced rings, a screen is extended between the axle of the assembly and one of said rings, this screen being preferably secured to both, and acting to prevent solid objects carried by the blast of air from entering the blower. This screen may be additionally utilized to serve as a support for means, such as vanes, secured thereto, for deflecting air across the outer braking face of the adjacent ring, thereby augmenting the cooling effect of the air on the ring.

Other and further objects and advantages and the manner in which they are attained will become evident from the following detailed description when read in connection with the drawings forming a part of this specification.

Figure 2:
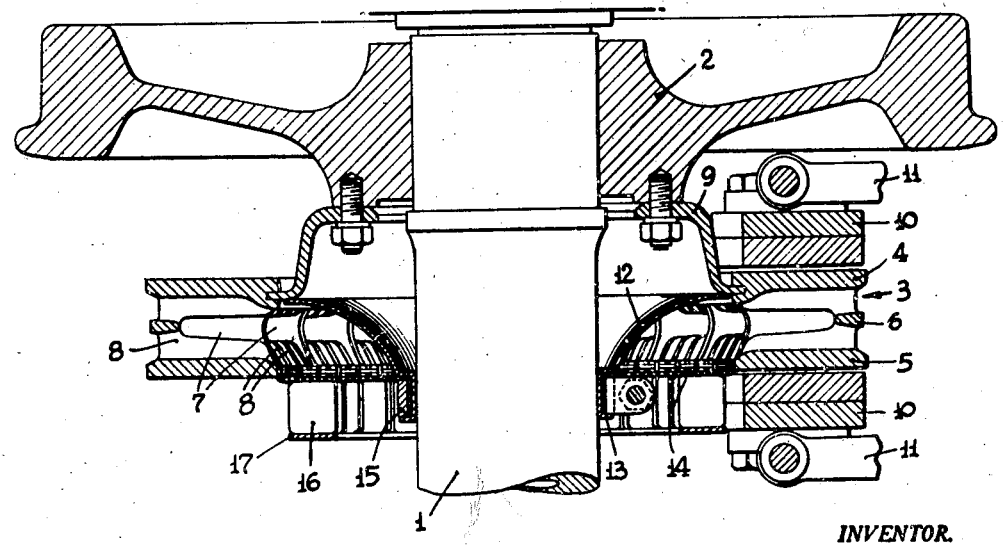

In the drawings:

Figure 1 is a side elevational view of the brake parts according to the invention, parts being broken away; and Figure 2 is a sectional view taken substantially along the line 2—2 of Figure 1.

In the embodiment selected for illustration the invention is shown applied to the general type of brake disclosed in Eksergian Patent No. 2,233,594 for "Brake disc," issued March 4, 1941.

Referring to the drawings numeral 1 designates the axle of a wheel and axle assembly and 2 designates a wheel thereof. Concentrically mounted on the hub of the wheel 2 is the rotary brake member 3 of the centrifugal blower type.

It comprises the radial brake rings 4 and 5 and intermediate shallow depth ring 6 all interconnected by circumferentially spaced generally radially extending bracing webs 7 and intermediate vanes 8 all as shown in the afore-mentioned patent.

The blower so formed is located in radially spaced relation from the axle 1 and in axially spaced relation from the wheel 2 by a dished support web 9 bolted to the hub of the wheel and having its peripheral margin embedded in adjacent ring 4.

The braking faces formed by the outer sides of the rings 4 and 5 are adapted to be engaged to effect the braking by non-rotary elements such as the segmental shoes 10, 10 pivotally carried by the brake levers 11, 11 which may be actuated in well known manner.

The rings 4 and 5 and the interconnecting braces 7 form radial passages through which the cooling air is passed, when the parts are rotating, in the manner of a centrifugal blower. To lead the cooling air more directly and smoothly to the radially inner ends of said radial passages, the invention contemplates the use of an air deflecting means, which, as shown, takes the form of a dished disc 12 having its outer periphery terminating substantially at the inner periphery of the ring 4. It may be located against the outer offset margin of the support web 9, as shown in Figure 2. At its inner end the dished disc terminates in an outwardly facing channel 13 fitting the axle 1, the inner margin of the disc exclusive of the channel lying substantially in the plane of the braking face of the ring 5. The curved dish of the disc deflects the air flowing along the axle smoothly into the radial passages of the blower formed by the rings 4 and 5 and their interconnecting braces 7.

A wire or other screen 14 is preferably provided to avoid solid particles, such as small ballast, from being drawn into and clogging the blower passages. This screen is attached at its outer periphery to the inner periphery of the ring 5, as by welding, and its inner margin is inserted in the channel 13 and clamped therein by a ring clamp, as 15, tightened by a usual screw.

With the arrangement shown, the ring 4 in conducting relation with the support web 9 tends to cool somewhat more rapidly than the outer ring 5, and to equalize the cooling effect, the screen may be utilized to support a plurality of radial vanes, as 16, which may be welded or otherwise secured thereto, these fins acting to direct air across the braking face of the outer ring 5.

The action of the vanes is increased by securing a ring 17 across their ends opposite the screen, thereby connecting them into a centrifugal blower.

Thus an equalized cooling effect is obtained on both rings 4 and 5 and the cooling is augmented both by the deflector disc 12 and the vanes 16, at the same time, the cooling air is screened as it enters the blower passages, preventing clogging thereof with solid particles. The screen conveniently serves to support the vanes 16 and associated ring 17.

While a specific embodiment of the invention has been herein shown and described it will be understood that changes and modifications may be made by those skilled in the art without departing from the main features of the invention, and such changes and modifications are intended to be covered in the appended claims.

What is claimed is:

1. In a brake arrangement, a wheel and axle assembly comprising an axle and a wheel mounted thereon, a rotary brake element comprising rings, each having a braking face, spaced from the wheel and from each other and interconnected by circumferentially spaced generally radially extending bracing webs forming with said rings passages for cooling air, a support means separate from the wheel for securement to the wheel radially inwardly of said rings for mounting said rings on said wheel, and curved air deflecting means extending from a region adjacent said axle radially outwardly to the one of said rings more remote from said region for leading the cooling air to the inner ends of said passages.

2. In a brake arrangement, a wheel and axle assembly, a rotary brake element comprising spaced rings interconnected by circumferentially spaced generally radially extending bracing webs forming with said rings passages for cooling air, a support web joining one of said rings to a wheel of said assembly, and an open mesh screen extending from the axle of said assembly radially outwardly to the other of said rings.

3. In a brake arrangement, a wheel and axle assembly, a rotary brake element comprising spaced rings interconnected by circumferentially spaced generally radially extending bracing webs forming with said rings passages for cooling air, a support web joining one of said rings to a wheel of said assembly, a screen extending between the axle of said assembly and the other of said rings, and vanes for directing air across the outer face of the adjacent ring secured to said screen.

4. In a wheel and axle assembly, a brake member of the centrifugal blower type having opposed braking faces and mounted through a support on said assembly and spaced radially from the axle of said assembly, an air screen extending from the axle radially to said member to screen the air passing to the blower and means carried by said screen for directing air across the adjacent braking face of said member.

CAROLUS L. EKSERGIAN.

REFERENCES CITED

The following references are of record in the file of this patent:

UNITED STATES PATENTS

| Number | Name | Date |
|---|---|---|
| 1,761,827 | Greve | June 3, 1930 |
| 2,181,008 | Bonzack | Nov. 21, 1939 |
| 2,369,328 | Watts | Feb. 13, 1945 |
| 2,351,573 | Ledwinka | June 13, 1944 |